(12) United States Patent
Wang et al.

(10) Patent No.: US 10,866,454 B2
(45) Date of Patent: Dec. 15, 2020

(54) DISPLAY PANEL AND DISPLAY DEVICE (71) Applicant: BOE TECHNOLOGY GROUP CO., LTD., Beijing (CN)

(72) Inventors: Can Wang, Beijing (CN); Yafeng Yang, Beijing (CN); Jian Gao, Beijing (CN); Can Zhang, Beijing (CN); Wei Wang, Beijing (CN); Jifeng Tan, Beijing (CN); Xinli Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 537 days.

(21) Appl. No.: 15/571,918

(22) PCT Filed: May 10, 2017

(86) PCT No.: PCT/CN2017/083728
§ 371 (c)(1),
(2) Date: Nov. 6, 2017

(87) PCT Pub. No.: WO2017/202202
PCT Pub. Date: Nov. 30, 2017

(65) Prior Publication Data
US 2018/0231831 A1 Aug. 16, 2018

(30) Foreign Application Priority Data
May 27, 2016 (CN) .......................... 2016 1 0366346

(51) Int. Cl.
G02F 1/1335 (2006.01)
G02F 1/29 (2006.01)
(Continued)

(52) U.S. Cl.
CPC ... *G02F 1/133526* (2013.01); *G02B 27/0961* (2013.01); *G02B 30/27* (2020.01); *G02F 1/133514* (2013.01); *G02F 1/29* (2013.01)

(58) Field of Classification Search
CPC ......... G02F 1/29; G02F 1/133526; G02F 1/13
See application file for complete search history.

(56) References Cited

U.S. PATENT DOCUMENTS 5,682,215 A * 10/1997 Nishihara ......... G02F 1/133526
349/95
2007/0127348 A1* 6/2007 Ooi .......................... G02B 3/08
369/112.02
(Continued)

FOREIGN PATENT DOCUMENTS

CN 102958706 A 3/2013
CN 104464523 A 3/2015
(Continued)

OTHER PUBLICATIONS

Second Office Action for Chinese Patent Application No. 201610366346.2 dated Mar. 12, 2018.
(Continued)

Primary Examiner — Hoan C Nguyen
(74) Attorney, Agent, or Firm — Calfee, Halter & Griswold LLP (57) ABSTRACT A display panel and a display device are disclosed. The display panel includes a flat display substrate and optical devices. The optical devices are arranged on a display surface of the flat display substrate, and light emitted through the display surface of the flat display substrate passes through the optical devices and forms an image in a curved surface.

16 Claims, 7 Drawing Sheets (51) Int. Cl.
*G02B 27/09* (2006.01)
*G02B 30/27* (2020.01)

(56) References Cited

U.S. PATENT DOCUMENTS

| | | | | |
|---|---|---|---|---|
| 2008/0094716 | A1* | 4/2008 | Ushiro | G02F 1/133526 359/620 |
| 2011/0128472 | A1* | 6/2011 | Hirata | G02F 1/13471 349/62 |
| 2013/0335649 | A1* | 12/2013 | Mather | H04N 13/356 349/15 |
| 2014/0098423 | A1 | 4/2014 | Uchimoto et al. | |
| 2015/0062390 | A1* | 3/2015 | Kim | G02B 3/0043 348/273 |
| 2015/0153578 | A1 | 6/2015 | Oka et al. | |
| 2016/0195646 | A1 | 7/2016 | Su et al. | |
| 2017/0034503 | A1* | 2/2017 | Zhou | H01L 27/3211 |
| 2017/0285223 | A1* | 10/2017 | Zhou | G02B 3/08 |
| 2018/0203164 | A1* | 7/2018 | Yamamoto | G02B 3/0068 |
| 2018/0231694 | A1* | 8/2018 | Ma | G02B 3/005 |

FOREIGN PATENT DOCUMENTS

| | | |
|---|---|---|
| CN | 105607380 A | 5/2016 |
| CN | 105607381 A | 5/2016 |
| CN | 105629622 A | 6/2016 |
| CN | 105700269 A | 6/2016 |
| CN | 105807481 A | 7/2016 |
| CN | 105842905 A | 8/2016 |
| CN | 105866865 A | 8/2016 |
| CN | 105894970 A | 8/2016 |
| CN | 106054289 A | 10/2016 |
| CN | 205787479 U | 12/2016 |
| CN | 205809337 U | 12/2016 |
| JP | 2015102808 A | 6/2015 |
| KR | 20150081106 A | 7/2015 |

OTHER PUBLICATIONS

Search Report for International Patent Application No. PCT/CN2017/083728 dated Aug. 16, 2017.
First Office Action for Chinese Patent Application No. 201610366346.2 dated Jul. 4, 2017.

* cited by examiner

DISPLAY PANEL AND DISPLAY DEVICE

RELATED APPLICATIONS

The present application is the U.S. national phase entry of PCT/CN2017/083728, with an international filing date of May 10, 2017, which claims the benefit of Chinese Patent Application No. 201610366346.2, filed on May 27, 2016, the entire disclosures of which are incorporated herein by reference.

TECHNICAL FIELD

The present disclosure relates to the field of display technology, and particularly to a display panel and display device.

BACKGROUND

A user's visual perception can be satisfied well with a curved display panel. The curved display provides more comfortable visual experience and realistic scene feeling for the user, and thus provides an enhanced immersive effect.

Generally, a flat display substrate is physically and mechanically bent to form a curved display panel for realizing a curved display. However, in this method for realizing a curved display, a deformation of a fringe field results in defects like light leakage and abnormal color display in the display panel.

Moreover, in order to realize the curved display, many modules in the display panel have to adopt flexible design, and this leads to a low yield and high cost of the product.

SUMMARY

Embodiments of the present disclosure provide a display panel and a display device, for realizing the curved display effect without physically and mechanically curving the flat display substrate.

Embodiments of the present disclosure provide a display panel, comprising a flat display substrate and optical devices, wherein the optical devices are arranged on a display surface of the flat display substrate, and light emitted through the display surface of the flat display substrate passes through the optical devices and forms an image in a curved surface.

In this embodiment, the display panel is provided with optical devices on the display surface of the flat display substrate, and the optical devices enable an image formed by the flat display substrate to lie in a spatially curved surface. Thus, the curved display effect is realized without physically and mechanically curving the flat display substrate, and this enhances the visual impact effect for the user.

In certain exemplary embodiments, the optical devices are convex lenses. In certain exemplary embodiments, the focus length of the convex lens at a position corresponding with the middle region of the flat display substrate is different from the focus length of the convex lens at a position corresponding with the peripheral region of the flat display substrate.

In certain exemplary embodiments, the optical devices are concave lenses. In certain exemplary embodiments, the focus length of the concave lens at a position corresponding with the middle region of the flat display substrate is different from the focus length of the concave lens at a position corresponding with the peripheral region of the flat display substrate.

In certain exemplary embodiments, the optical devices are liquid crystal lenses. In certain exemplary embodiments, a deflection degree of liquid crystal in the liquid crystal lenses at a position corresponding with the middle region of the flat display substrate is different from a deflection degree of liquid crystal in the liquid crystal lenses at a position corresponding with the peripheral region of the flat display substrate.

In certain exemplary embodiments, the optical devices consist of at least two of a convex lens, a concave lens, and a liquid crystal lens. In an example, a portion of the optical devices are convex lenses, another portion of the optical devices are concave lenses, and the remaining optical devices are liquid crystal lenses. In an example, a portion of the optical devices are convex lenses, and the remaining optical devices are concave lenses. In an example, a portion of the optical devices are convex lenses, and the remaining optical devices are liquid crystal lenses. In an example, a portion of the optical devices are concave lenses, and the remaining optical devices are liquid crystal lenses.

In certain exemplary embodiments, the optical devices at a position corresponding with a middle region of the flat display panel have an optical parameter which is different from the optical parameter of the optical devices at a position corresponding with a peripheral region of the flat display panel. The optical parameter is a focus length of the convex lens or concave lens, or is a deflection degree of liquid crystal in the liquid crystal lens.

In certain exemplary embodiments, two of the optical devices which are arranged symmetrically with respect to a central symmetrical axis of the flat display substrate have a same optical parameter. In an example, two of the convex lenses which are symmetrically arranged with respect to the central symmetrical axis of the flat display substrate have a same focus length.

In certain exemplary embodiments, an object distance between each convex lens and the flat display substrate is smaller than a focus length of each convex lens, and the focus length of each convex lens decreases with an increase in a distance between the convex lens and the central symmetrical axis.

In certain exemplary embodiments, an object distance between each convex lens and the flat display substrate is larger than a focus length of each convex lens, and the focus length of each convex lens increases with an increase in a distance between the convex lens and the central symmetrical axis.

In certain exemplary embodiments, an object distance between each convex lens at a position corresponding with the middle region of the flat display substrate and the flat display substrate is smaller than the focus length of the convex lens at this position, and an object distance between each convex lens at a position corresponding with a peripheral region of the display panel and the flat display substrate is larger than the focus length of the convex lens at this position.

In certain exemplary embodiments, the position of each of the optical devices corresponds with the position of each pixel or each sub-pixel in the flat display substrate in a one-to-one manner. In an example, the position of each of the convex lenses corresponds with the position of each pixel in the flat display substrate in a one-to-one manner. In an example, the position of each of the convex lenses corresponds with the position of each of the sub-pixels which form pixels in the flat display substrate in a one-to-one manner.

In certain exemplary embodiments, each of the convex lenses is a plano-convex lens, and a convex surface of the plano-convex lens is arranged on a side away from the flat display substrate.

In certain exemplary embodiments, each of the convex lenses is a combination of a half plano-convex lens with a complete plano-convex lens, a half plano-convex lens, or a complete plano-convex lens. In an example, each of the convex lenses is a complete plano-convex lens. In an example, all of the convex lenses are half plano-convex lenses. In an example, a portion of the convex lenses are complete plano-convex lenses, and the remaining convex lenses are half plano-convex lenses.

In certain exemplary embodiments, two the concave lenses which are arranged symmetrically with respect to the central symmetrical axis of the flat display substrate have a same focus length.

In certain exemplary embodiments, a focus length of each of the concave lenses decreases with an increase in a distance between the concave lens and the central symmetrical axis.

In certain exemplary embodiments, the position of each of the optical devices corresponds with the position of each pixel or each sub-pixel in the flat display substrate in a one-to-one manner. In an example, the position of each of the concave lenses corresponds with the position of each pixel in the flat display substrate in a one-to-one manner. In an example, the position of each of the concave lenses corresponds with the position of each of the sub-pixels which form pixels in the flat display substrate in a one-to-one manner.

In certain exemplary embodiments, each of the concave lenses is a plano-concave lens, and a concave surface of each of the plano-concave lenses is arranged on a side away from the flat display substrate.

In an example, all of the concave lenses are complete plano-concave lenses. In an example, all of the concave lenses are half plano-concave lenses. In an example, a portion of the concave lenses are complete plano-concave lenses, and the remaining concave lenses are half plano-concave lenses.

In certain exemplary embodiments, two of the liquid crystal lenses which are arranged symmetrically with respect to the central symmetrical axis of the flat display substrate have a same deflection degree of liquid crystal.

In an example, the position of each of the liquid crystal lenses corresponds with the position of each pixel in the flat display substrate in a one-to-one manner. In an example, the position of each of the liquid crystal lenses corresponds with the position of each sub-pixel which forms the pixel in the flat display substrate in a one-to-one manner.

In certain exemplary embodiments, the flat display substrate is a liquid crystal display panel or an organic light emitting display panel.

Embodiments of the present disclosure further provide a display device, comprising the display panel as described above.

DETAILED DESCRIPTION OF EMBODIMENTS

Embodiments of the present disclosure provide a display panel and a display device, which realize the curved display effect without physically and mechanically curving the flat display substrate.

To make the objects, the technical solutions and the advantages of embodiments of the present disclosure more apparent, the technical solutions of the embodiments of the present disclosure will be described in detail hereinafter in conjunction with the drawings of the embodiments of the present disclosure. Apparently, the embodiments described hereinafter are only some embodiments of the present disclosure, but not all embodiments. Based on the embodiments described hereinafter, other embodiments obtained by those skilled in the art should fall within the scope of the present disclosure.

The display panel in embodiments of the present disclosure will be described hereinafter with reference to the accompanying drawings.

The shape and size of components in the drawings do not reflect the true scale of the display panel, but schematically show the contents of the present disclosure.

Figure 1:
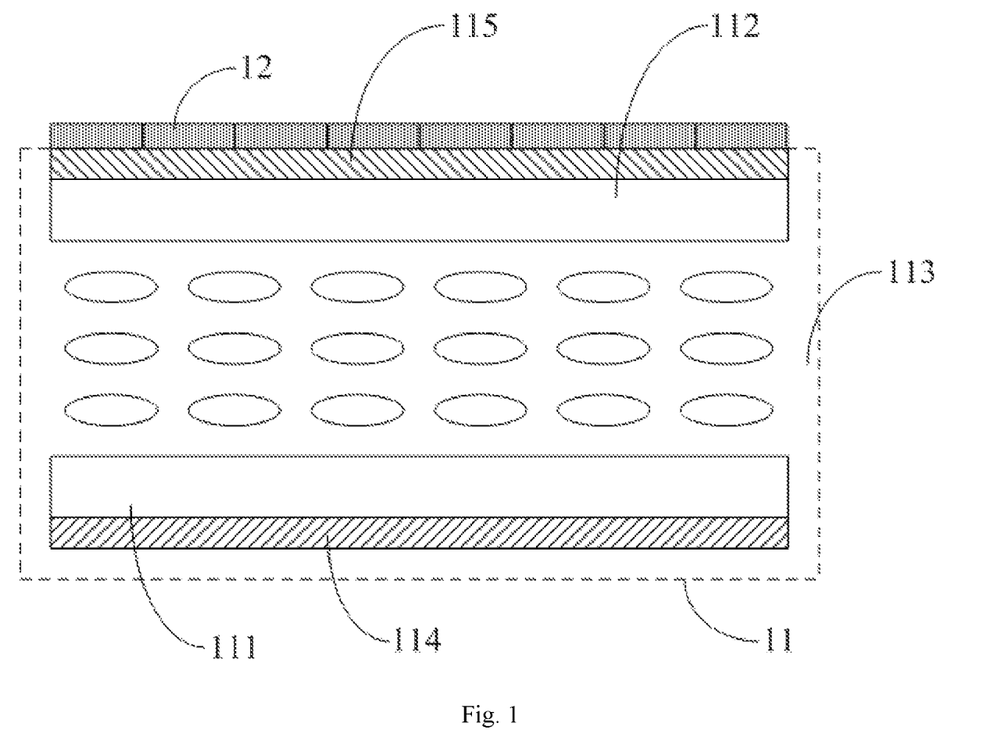
FIG. 1 is a structural view for illustrating a display panel in an embodiment of the present disclosure.

As shown in FIG. 1, an embodiment of the present disclosure provides a display panel, comprising a flat display substrate 11, and optical devices 12 which are arranged in an array on a display surface of the flat display substrate 11. The optical devices 12 enable an image formed by the flat display substrate 11 to lie in a spatially curved surface.

In an embodiment, the flat display substrate 11 is a liquid crystal display panel or an organic light emitting display panel. Of course, during practical production, the flat display substrate 11 for example is a flat display substrate for a plasma display panel, and embodiments of the present disclosure are not limited in term of the type of the flat display substrate.

As shown in FIG. 1, in embodiments of the present disclosure, the flat display substrate 11 will be described in detail by taking a liquid crystal display panel as an example. In an embodiment, the flat display substrate 11 comprises an array substrate 111 and a color film substrate 112 which are arranged oppositely, a liquid crystal layer 113 which is arranged between the array substrate 111 and the color film substrate 112, a lower polarizer 114 which is arranged on a side of the array substrate 111 opposite to the color film substrate 112, and an upper polarizer 115 which is arranged on a side of the color film substrate 112 opposite to the array substrate 111. As shown, the optical devices 12 are arranged on the display surface of the flat display substrate 11. The display surface of the flat display substrate 11 is a light exit surface of the flat display substrate 11. Light which exits through the display surface of the flat display substrate 11 passes through the optical devices 12 and forms an image in a curved surface.

In embodiments of the present disclosure, the display panel comprises optical devices, the optical devices are arranged on a display surface of the flat display substrate, and light emitted through the display surface of the flat display substrate passes through the optical devices and forms an image in a curved surface. This realizes the curved display effect without physically and mechanically curving the flat display substrate, and enhances the visual impact effect for the user Moreover, as compared with the conventional curved display, the display panel according to embodiments of the present disclosure increases the yield of curved display, reduces the cost of the curved display, and increases the competitiveness of product.

Optical devices according to embodiments of the present disclosure will be described in detail hereinafter with reference to the accompanying drawings.

Figure 2:
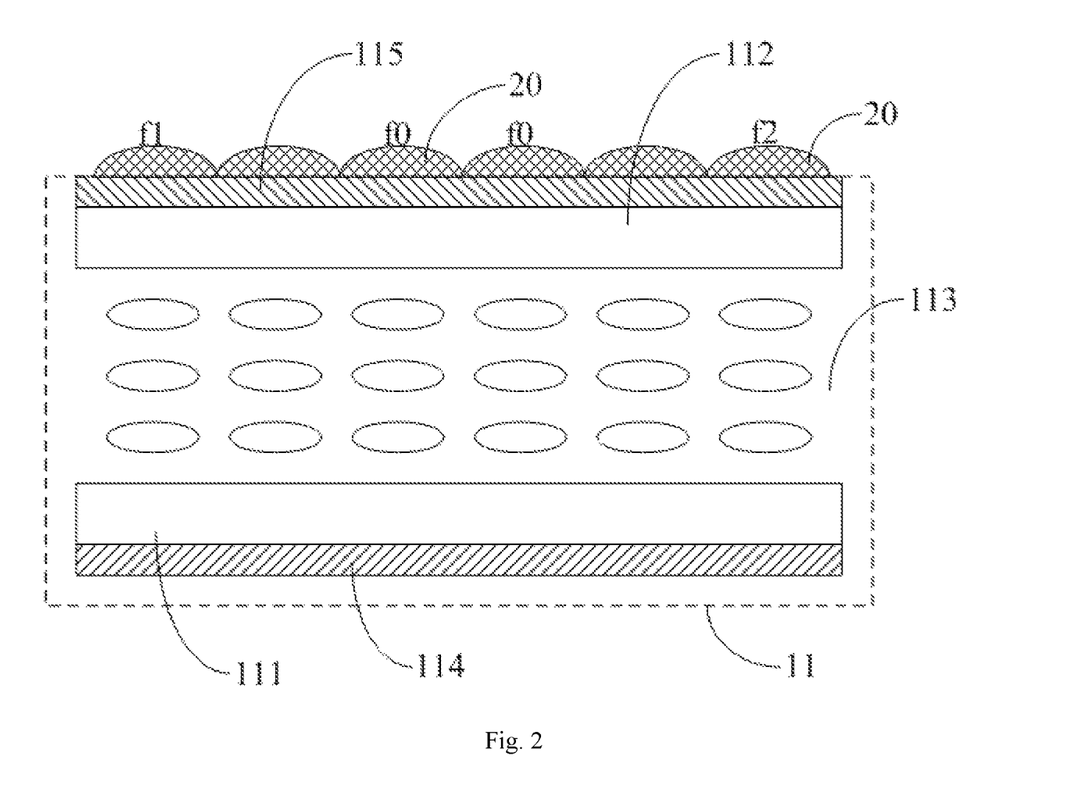
FIG. 2 is a structural view for illustrating a display panel in an embodiment of the present disclosure in which the optical devices are convex lenses.

As shown in FIG. 2, in an embodiment, the optical devices are convex lenses 20. The optical parameter of convex lenses 20 at a position corresponding with a different region of the flat display substrate 11 is set accordingly. For example, in this embodiment, the optical parameter is the focus length of each of the convex lenses 20.

In an embodiment, the convex lens 20 at a position corresponding with a middle region of the flat display substrate 11 has a focus length which is different from the focus length of the convex lens at a position corresponding with a peripheral region of the flat display substrate 11. For example, the convex lens 20 at a position corresponding with the middle region of the flat display substrate 11 has a focus length f0, the convex lens 20 at a position corresponding with a left edge of the flat display substrate 11 has a focus length f1, the convex lens 20 at a position corresponding with a right edge of the flat display substrate 11 has a focus length f2, and f0≠f1≠f2. In this case, all convex lenses 20 have a same object distance with respect to the flat display substrate, while convex lenses 20 at different positions have focus lengths f0≠f1≠f2. Thus, light which exits through the display surface of the flat display substrate 11 passes through the optical devices 12 and forms an image in a curved surface. Namely, the convex lenses in this embodiment enable the image formed by the flat display substrate to lie in a spatially curved surface.

Figure 3:
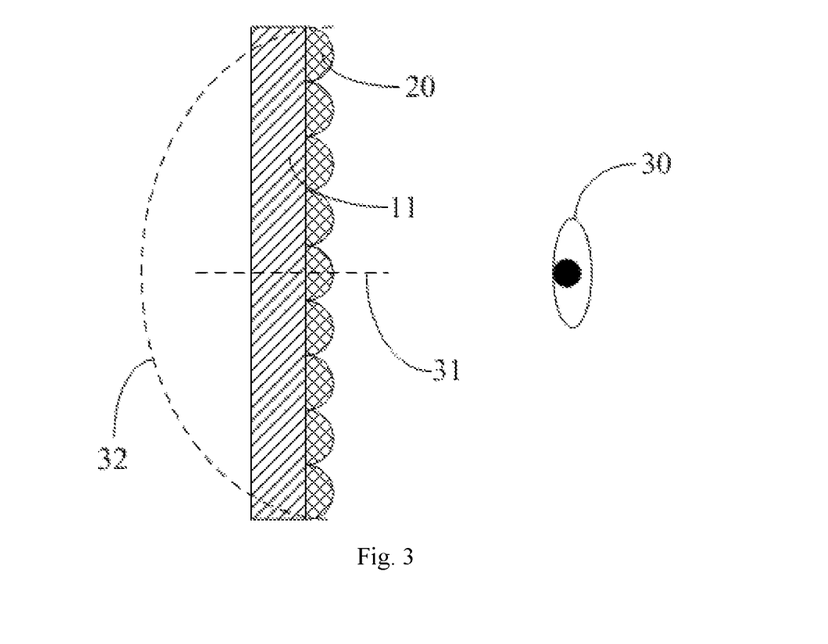
FIG. 3 is a schematic view for illustrating a display panel in an embodiment of the present disclosure in which a curved display is being realized.

In an embodiment, for example, two convex lenses 20 which are arranged symmetrically with respect to a central symmetrical axis of the flat display substrate 11 have a same focus length. As shown in FIG. 2, these convex lenses 20 have a focus length f1=f2. In an embodiment, the central symmetrical axis of the flat display substrate for example is a vertical central symmetrical axis. As shown in FIG. 3, the vertical central symmetrical axis 31 of the flat display substrate 11 indicates a symmetrical axis in a vertical direction of the flat display substrate 11 with respect to human eyes 30. In a practical design, since two convex lenses which are arranged symmetrically with respect to the vertical central symmetrical axis of the flat display substrate have a same focus length, these convex lenses enable an image formed by the flat display substrate 11 to lie in a spatially curved surface. The curved surface has a track as shown by a track 32 in FIG. 3. In this way, an image of the curved display will be perceived by human eyes 30.

For example, as shown in FIG. 2, in embodiments of the present disclosure, each of the convex lenses 20 are plano-convex lenses, and the convex surface of the plano-convex lens is arranged on a side away from the flat display substrate 11. In this way, the plano-convex lenses can be fabricated more easily.

Figure 4:
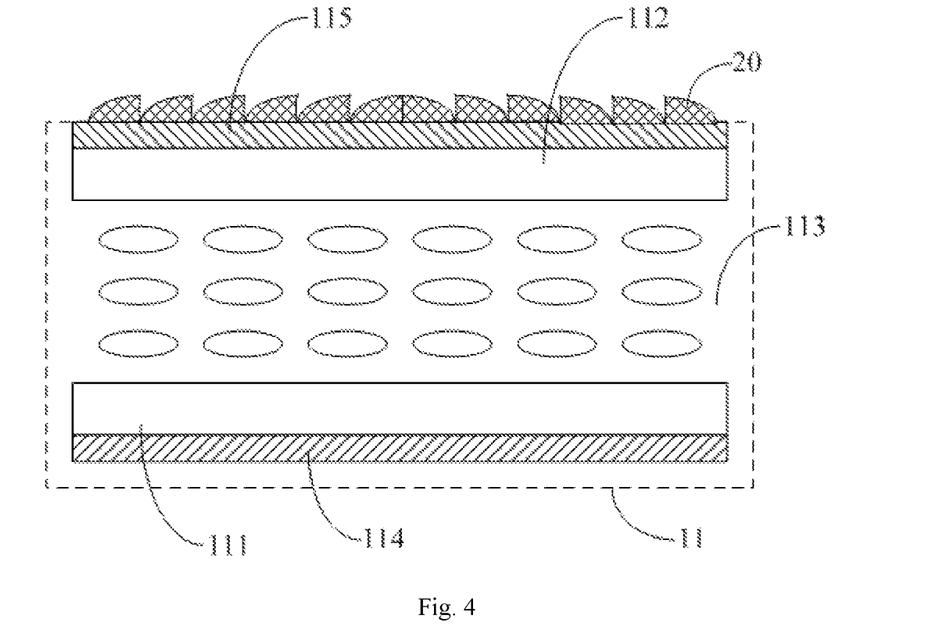
FIG. 4 is a structural view for illustrating another display panel in an embodiment of the present disclosure in which the optical devices are convex lenses.

In an embodiment, each of the convex lenses is a complete plano-convex lens, as shown in FIG. 2. In another embodiment, each of the convex lenses is a one-half (½) plano-convex lens, as shown in FIG. 4. In another embodiment, a portion of convex lenses are complete plano-convex lenses, while the remaining convex lenses are ½ plano-convex lenses. Moreover, during practical production, other types of plano-convex lenses can be adopted. For example, some of the convex lenses are one quarter (¼) plano-convex lenses. In embodiments of the present disclosure in which the convex lenses are ½ plano-convex lenses, this facilitates converging effect for the light ray, and the exit light of the flat display substrate can be utilized more efficiently.

Figure 5:
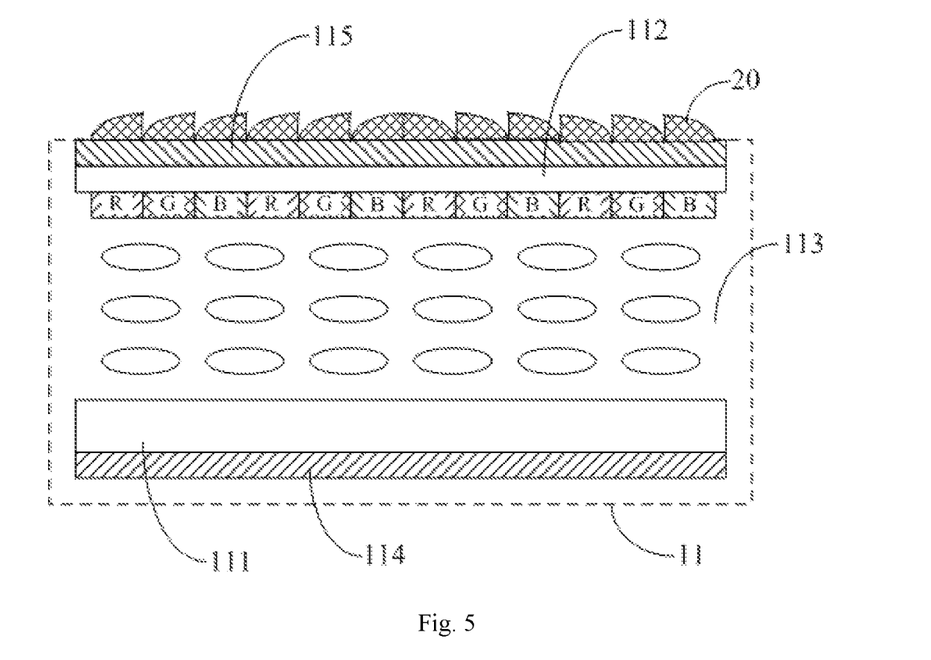
FIG. 5 is a schematic view for illustrating a positional corresponding relationship between optical devices and sub-pixels which form pixels in the flat display substrate in an embodiment of the present disclosure.

In an embodiment, the position of each of the convex lenses corresponds with the position of each of the pixels in the flat display substrate in a one-to-one manner. In another embodiment, the position of each of the convex lenses corresponds with the position of each of the sub-pixels which form pixels in the flat display substrate in a one-to-one manner. In the following embodiments, reference is made to an example in which the position of each of the convex lenses corresponds with the position of each of the sub-pixels which form pixels in the flat display substrate in a one-to-one manner, and the convex lenses are ½ plano-convex lenses, as shown in FIG. 5.

Figure 6A:
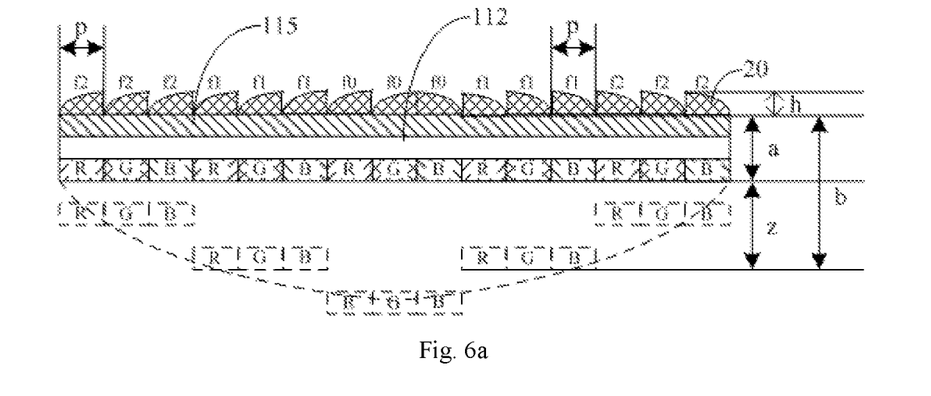
FIG. 6a, FIG. 6b and FIG. 6c are schematic view for illustrating a display panel in an embodiment of the present disclosure in which a curved display is being realized.
Figure 6B:
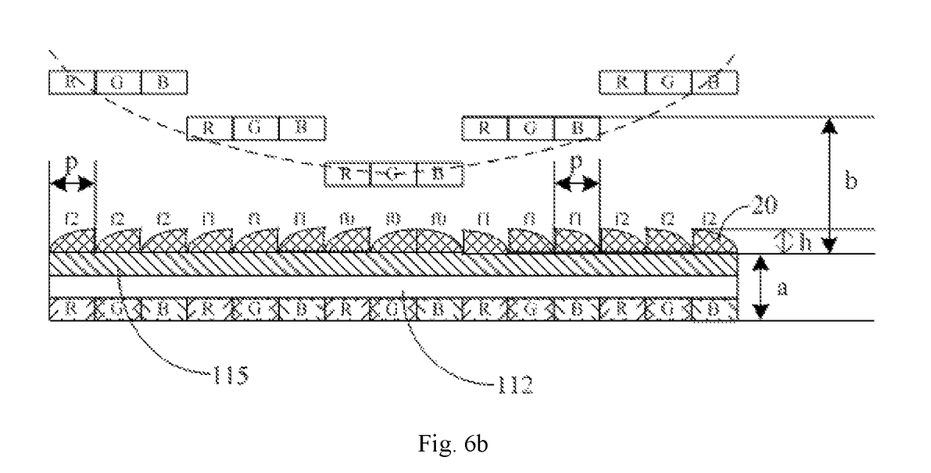
Figure 6C:
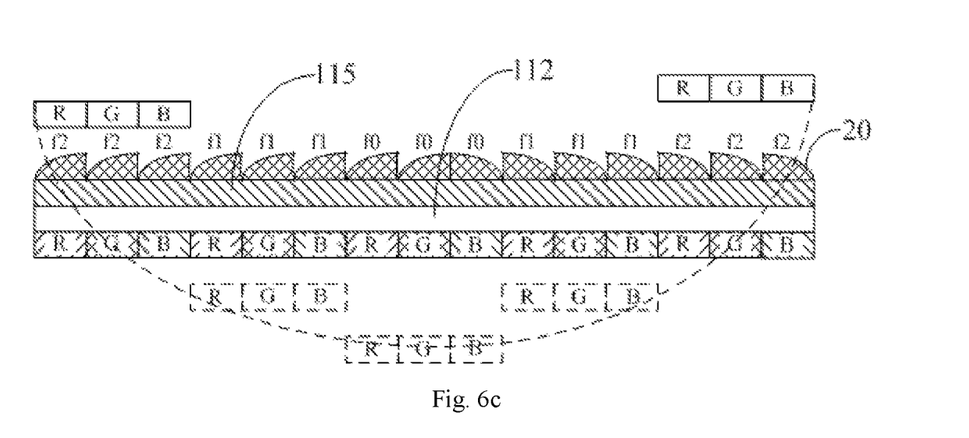

A process for realizing the curved display by means of a plurality of convex lenses in an embodiment of the present disclosure will be described hereinafter with reference to FIG. 6a, FIG. 6b, and FIG. 6c. FIG. 6a, FIG. 6b, and FIG. 6c only show a portion of the flat display substrate, and FIG. 6a, FIG. 6b, and FIG. 6c show sub-pixels R, G, and B which form pixels in the flat display substrate.

In an embodiment of the present disclosure, according to the image forming principle of the convex lenses, the focus length of the convex lenses are set in such a manner that a distance between pixels of the flat display substrate and the convex lenses (i.e., object distance) is smaller than the focus length of each of the convex lenses. As a result, images formed by pixels at different positions of the flat display substrate constitute an upright and enlarged virtual image which is perceived by human eyes, as shown in FIG. 6a. Of course, it is also possible to set the focus length of the convex lenses in such a manner that the distance between pixels of the flat display substrate and the convex lenses (i.e., object distance) is larger than the focus length of each of the convex lenses. In this case, images formed by pixels at different positions of the flat display substrate constitute an inverted real image which is perceived by human eyes, as shown in FIG. 6b. Furthermore, it is possible to set the focus length of the convex lenses in such a manner that the distance between a portion of pixels of the flat display substrate and the convex lenses is larger than the focus length of the convex lenses at a position corresponding with this portion of pixels, and the distance between another portion of pixels and the convex lenses is smaller than the focus length of the convex lenses at a position corresponding with this portion of pixels. In this case, images formed by the portion of pixels of the flat display substrate constitute an upright virtual image, and images formed by the another portion of pixels of the flat display substrate constitute an inverted real image, as shown in FIG. 6c.

According to the following fundamental equations in an optical system:

object-image relationship:

$$\frac{1}{a} - \frac{1}{b} = \frac{1}{f} \quad (1)$$

focus length of a plano-convex lens:

$$\frac{1}{f} = \frac{r}{n1 - n2} \quad (2)$$

equation for an arch rise: $h = r - \sqrt{r^2 - p^2}$ (3)

In the above fundamental equations in the optical system, a indicates an object distance, b indicates an image distance, f indicates a focus length of a convex lens, r indicates a radius of curvature of a convex lens, and n1 indicates a refractive index of a convex lens. In FIG. 6a, FIG. 6b, and FIG. 6c, n2 indicates the refractive index of air, and n2=1. Of course, in practice, for example a planarization layer is arranged on an irregular surface of a convex lens, so that each convex lens has a planarized top surface. In this case, n2 indicates a refractive index of the planarization layer, h indicates an arch rise of the convex lens, and p indicates an aperture of the convex lens (a radius of the cross-section of the convex lens), as shown in FIG. 6a, FIG. 6b, and FIG. 6c.

According to the above fundamental equations in the optical system, when the object distance a is constant, convex lenses with different focus lengths f can correspond to different image distances b, and this nature is utilized. As shown in FIG. 6a, the object distance a between each of the convex lenses 20 and the flat display substrate is set to be smaller than the focus length of each of the convex lenses 20. The focus length of each of the convex lenses 20 decreases with an increase in the distance between the convex lenses 20 and the central symmetrical axis. Namely, in FIG. 6a, the central axis of the convex lens 20 with the focus length of f0 is taken as the central symmetrical axis, and f0>f1>f2. Finally, the image formed by the flat display substrate lies in a spatially curved surface, thus realizing the curved display effect.

Furthermore, according to the above equation (2), different radii of curvature r of the convex lenses correspond with different focus lengths f. In order that the convex lenses have different focus lengths f, the radius of curvature r of each convex lens is set, if the convex lenses are made from a same material. For example, according to the above equation (3), the arch rise h of each convex lens is set to a constant value, and the aperture p of each convex lens is set to different values so as to adjust the radius of curvature r. In another embodiment, the aperture p of each convex lens is set to a constant value, and the arch rise h of each convex lens is set to different values so as to adjust radius of curvature r. In practice, for ease of fabrication, convex lenses are generally arranged closely, the convex lenses are set to have a same aperture p, and the radius of curvature r is adjusted by the arch rise h of each convex lens.

As shown in FIG. 6a, if it is known that the image constituted by images formed by sub-pixels in the flat display substrate is required to displace backward by a distance z with respect to the flat display substrate, images display by this portion of sub-pixels pass through the convex lenses and form an image with an image distance b=a+z. From equations (1) and (2), the focus length f and the radius of curvature r of convex lenses corresponding with this portion of sub-pixels can be calculated.

According to the above fundamental equations in the optical system, when the object distance a is constant, convex lenses with different focus lengths f can correspond to different image distances b, and this nature is utilized. As shown in FIG. 6b, the object distance a between each of the convex lenses 20 and the flat display substrate is set to be larger than the focus length of each of the convex lenses 20. The focus length of each of the convex lenses 20 increases with an increase in the distance between the convex lenses 20 and the central symmetrical axis. Namely, in FIG. 6b, the central axis of the convex lens 20 with the focus length of f0 is taken as the central symmetrical axis, and f0<f1<f2. Finally, the image formed by the flat display substrate lies in a spatially curved surface, thus realizing the curved display effect. In embodiments of the present disclosure, the image formed by pixels at different positions of the flat display substrate passes through each of the convex lenses 20 and forms an enlarged real image, an equal real image, or a reduced real image.

According to the above fundamental equations in the optical system, when the object distance a is constant, convex lenses with different focus lengths f can correspond to different image distances b, and this nature is utilized. As shown in FIG. 6c, the object distance a between each of the convex lenses 20 at a position corresponding with a middle region of the flat display substrate and the flat display substrate is smaller than the focus lengths of this portion of convex lenses 20, and the object distance a between each of the convex lenses 20 at a position corresponding with a peripheral region of the flat display substrate and the flat display substrate is larger than the focus lengths of this portion of convex lenses 20. Then, images formed by pixels at the position corresponding with the middle region of the flat display substrate pass through the convex lenses and form a virtual image, and images formed by pixels at the position corresponding with the peripheral region of the flat display substrate pass through the convex lenses and form a real image.

Based on a same design, in FIG. 6c, the focus length of each convex lens at the position corresponding with the middle region of the flat display substrate decreases with an increase in the distance between the convex lens and the central symmetrical axis, and the focus length of each convex lens at the position corresponding with the peripheral region of the flat display substrate increases with an increase in the distance between the convex lens and the central symmetrical axis.

Figure 7:
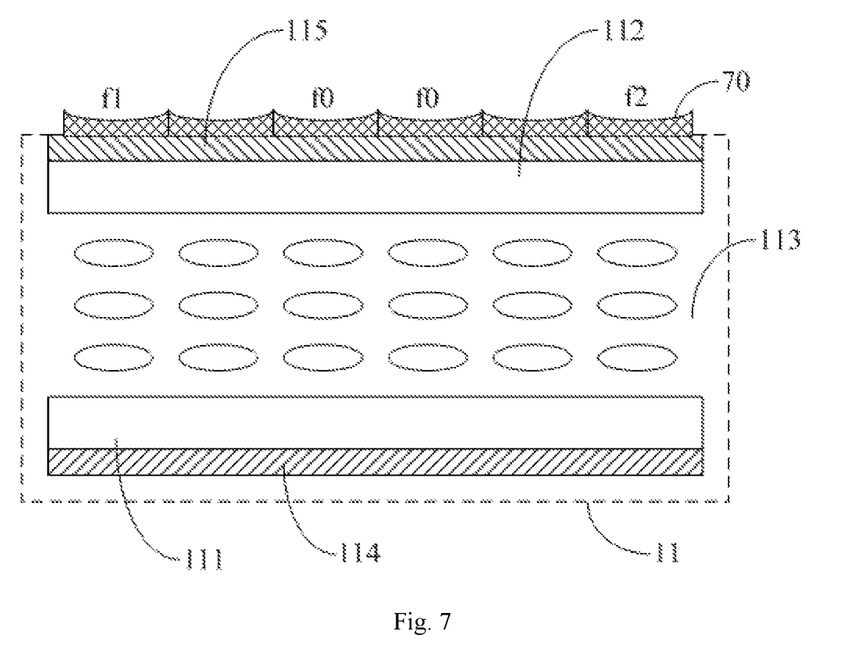
FIG. 7 is a structural view for illustrating a display panel in an embodiment of the present disclosure in which optical devices are concave lenses.

As shown in FIG. 7, in embodiments of the present disclosure, the optical devices are concave lenses 70, and the concave lenses 70 at positions corresponding with different regions of the flat display substrate 11 have an optical parameter which is set accordingly. For example, the optical parameter is the focus length of the concave lenses 70.

In an embodiment, the concave lenses 70 at the position corresponding with the middle region of the flat display substrate 11 have focus lengths which are different from the focus lengths of the concave lenses at the position corresponding with the peripheral region of the flat display substrate 11. Since the object distance between the concave lenses 70 and flat display substrate is constant, and the concave lenses 70 at different positions have different focus lengths, these concave lenses enable the image formed by the flat display substrate to lie in a spatially curved surface.

In embodiments of the present disclosure, two concave lenses which are arranged symmetrically with respect to the central symmetrical axis of the flat display substrate have a same focus length, as shown in FIG. 7. In this case, the concave lenses 70 have a focus length f1=f2. For example, in embodiments of the present disclosure, the central symmetrical axis of the flat display substrate is the vertical central symmetrical axis.

For example, as shown in FIG. 7, in embodiments of the present disclosure, each of the concave lenses 70 is a plano-concave lens, and a concave surface of each plano-concave lens is arranged on a side away from the flat display substrate 11. In this way, the plano-concave lenses can be fabricated more easily.

In an embodiment, each of the concave lenses is a complete plano-concave lens, as shown in FIG. 7. In another embodiment, each of the concave lenses is a ½ plano-concave lens, and reference can be made to the schematic view of the ½ plano-convex lens. Of course, in other embodiments, some of the concave lenses are complete plano-concave lenses, and the remaining concave lenses are ½ plano-concave lenses. Moreover, during practical production, other types of plano-concave lenses can be adopted. For example, some of the concave lenses are one quarter plano-concave lenses. In embodiments of the present disclosure in which the concave lenses are ½ plano-concave lenses, the exit light of the flat display substrate can be utilized more efficiently.

In an embodiment, the position of each of the concave lenses corresponds with the position of each of the pixels in the flat display substrate in a one-to-one manner. In another embodiment, the position of each of the concave lenses corresponds with the position of each of the sub-pixels which form pixels in the flat display substrate in a one-to-one manner. In the following embodiments, the positional corresponding relationship between each of the concave lenses and the pixels (and sub-pixels) in the flat display substrate is similar to the positional corresponding relationship between the convex lenses and the pixels (and sub-pixels) in the flat display substrate in the embodiments of FIGS. 2-6c.

In embodiments of the present disclosure, the fundamental equations in the concave lens optical system adopt known equations for image forming by concave lenses, and the calculation method for image forming by concave lenses is similar with the method of convex lenses in the above embodiments, which is not repeated here for simplicity. In embodiments of the present disclosure, for example, a focus length of each concave lens decreases with an increase in the distance between the concave lens and the central symmetrical axis.

In the foregoing, the display panel in embodiments of the present disclosure has been described in which optical devices 12 comprise conventional optical lenses like convex lenses and concave lenses.

Figure 8:
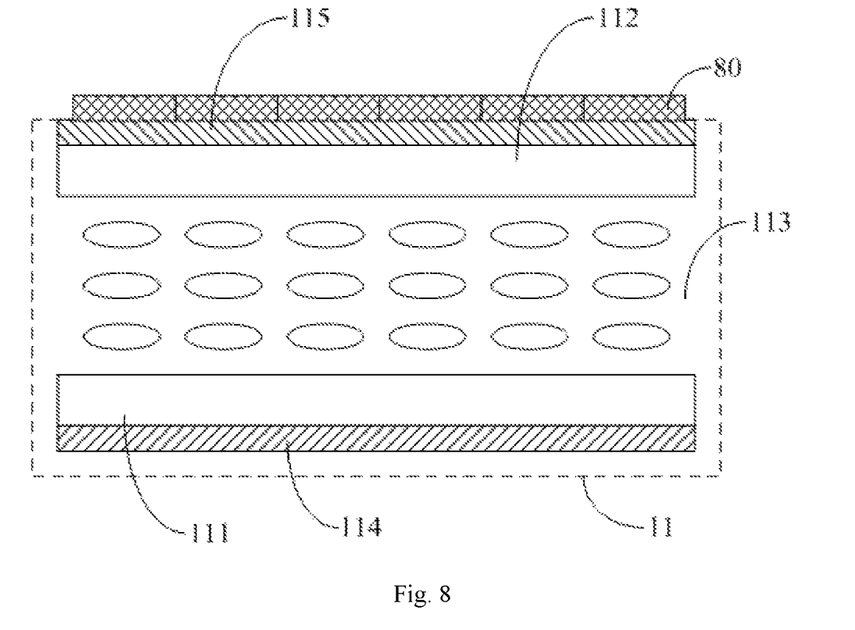
FIG. 8 is a structural view for illustrating a display panel in an embodiment of the present disclosure in which the optical devices are liquid crystal lenses.

As shown in FIG. 8, in an embodiment of the present disclosure, the optical devices are liquid crystal lenses 80. In this embodiment, the optical parameter of liquid crystal lenses 80 at a position corresponding with different regions of the flat display substrate 11 is set accordingly. In this context, the optical parameter is the focus length of liquid crystal lenses 80. In practice, the focus length of liquid crystal lenses 80 is adjusted by controlling a deflection degree of liquid crystal in the liquid crystal lenses 80. For example, the deflection degree of liquid crystal in liquid crystal lenses 80 at a position corresponding with the middle region of the flat display substrate 11 is different from the deflection degree of liquid crystal in liquid crystal lenses 80 at a position corresponding with the peripheral region of the flat display substrate 11.

The liquid crystal lens is a novel micro-lens which modifies the spatial distribution of refractive index by electro-optical effect and is fabricated by a microelectronic process. It is a novel optical device which combines the properties of the micro-lens and the excellent electrical control performance of the liquid crystal. The liquid crystal lens has advantages of micro size, adjustable focus length, or the like.

Figure 9:
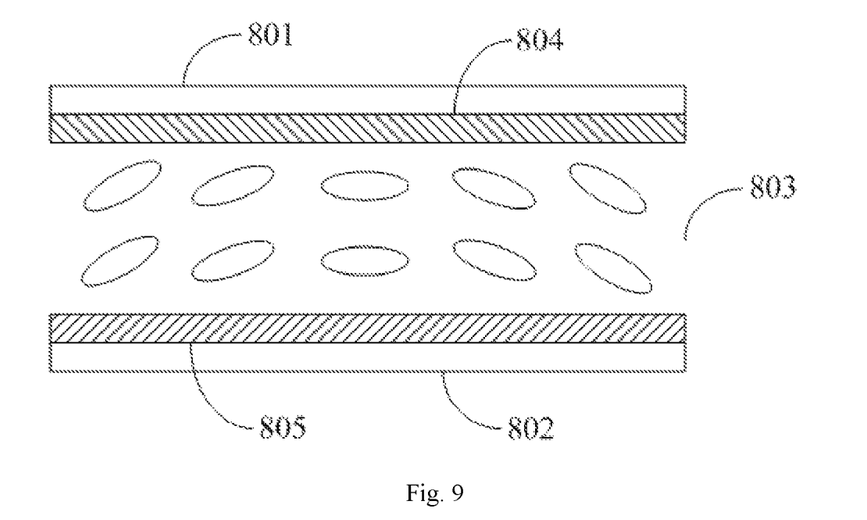
FIG. 9 is a structural view for illustrating liquid crystal lenses in an embodiment of the present disclosure.

For example, as shown in FIG. 9, in embodiments of the present disclosure, each of the liquid crystal lenses 80 comprises a first base plate 801 and a second base plate 802 which are arranged oppositely, a liquid crystal 803 which is arranged between the first base plate 801 and the second base plate 802, a first electrode 804 which is arranged at a side of the first base plate 801 facing the second base plate 802, and a second electrode 805 which is arranged at a side of the second base plate 802 facing the first base plate 801.

For example, in embodiments of the present disclosure, two liquid crystal lenses which are arranged symmetrically with respect to the central symmetrical axis of the flat display substrate have a same deflection degree of liquid crystal. This forms a symmetrically curved display, and further improves viewing experience for the user. In practice, deflection of liquid crystal is controlled by the voltage across the first and second electrodes in the liquid crystal lens, and an optical effect similar with the convex lens and concave lens in the conventional optical lens is realized.

In an embodiment, the position of each liquid crystal lens corresponds with the position of each of the pixels in the flat display substrate in a one-to-one manner. In another embodiment, the position of each liquid crystal lens corresponds with the position of each of the sub-pixels which form pixels in the flat display substrate in a one-to-one manner. The position of liquid crystal lenses can be set in a similar manner with the position of convex lenses in FIGS. 2-6c, which is not repeated here for simplicity.

In embodiments of the present disclosure, the liquid crystal lenses can also adopt other known types of liquid crystal lenses, and embodiments of the present disclosure are not limited by the type of the liquid crystal lens.

In embodiments of the present disclosure, the optical devices consist of at least two of a convex lens, a concave lens, and a liquid crystal lens. For example, a portion of the optical devices are convex lenses, another portion of the optical devices are concave lenses, and the remaining optical devices are liquid crystal lenses. For example, a portion of the optical devices are convex lenses, and the remaining optical devices are concave lens. For example, a portion of the optical devices are convex lenses, and the remaining optical devices are liquid crystal lenses. For example, a portion of the optical devices are concave lenses, and the remaining optical devices are liquid crystal lenses.

Figure 10A:
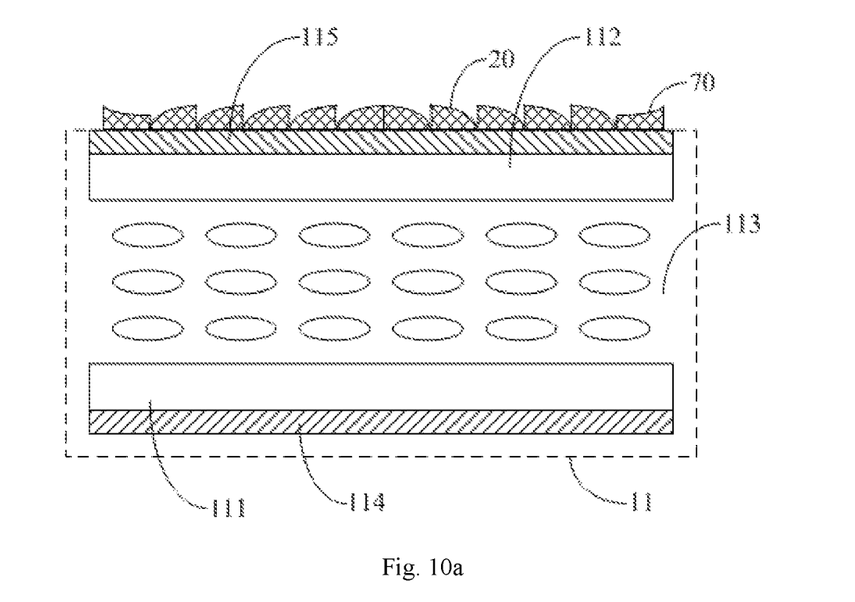
FIG. 10a and FIG. 10b are structural views for illustrating a display panel in an embodiment of the present disclosure in which some optical devices are convex lenses and the other optical devices are concave lenses.
Figure 10B:
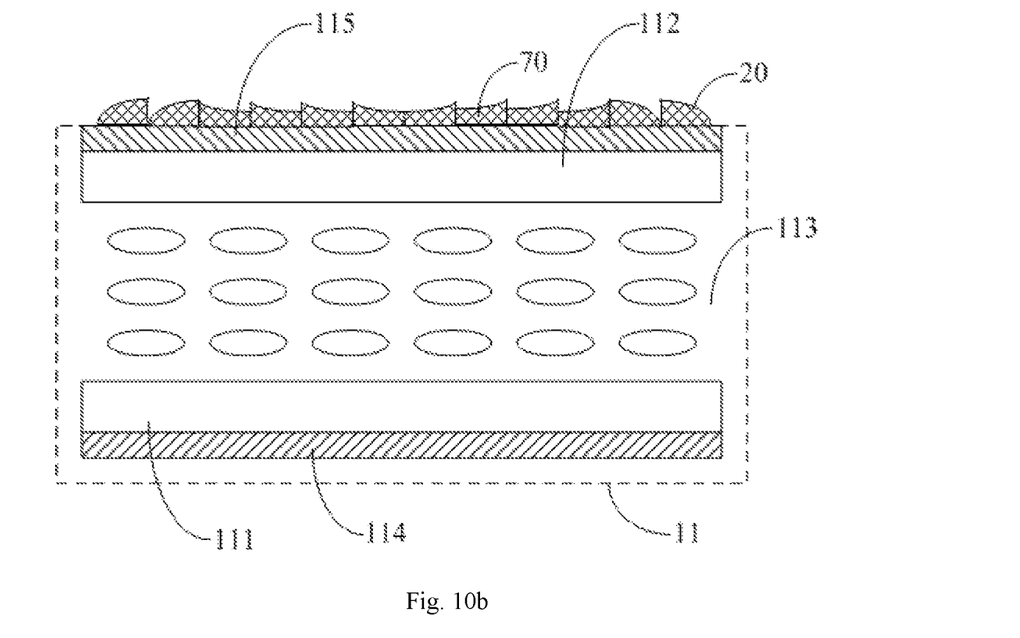

For example, as shown in FIG. 10a and FIG. 10b, a portion of optical devices are convex lenses 20, and the remaining optical devices are concave lenses 70. In an embodiment, the convex lenses 20 are located at a position corresponding with a first region of the flat display substrate 11, and the concave lenses 70 are located at a position corresponding with a second region of the flat display substrate 11. In another embodiment, concave lenses 70 are located at a position corresponding with the first region of the flat display substrate 11, and the convex lenses 20 are located at a position corresponding with the second region of the flat display substrate 11. The first region in this context is the middle region of the flat display substrate 11, and the second region is a region which surrounds the first region of the flat display substrate 11.

For example, the convex lenses 20 are plano-convex lenses. In an embodiment, the convex lenses 20 are ½ plano-convex lenses. The concave lenses 70 are plano-concave lenses. In an embodiment, the concave lenses 70 are ½ plano-concave lenses. Only one plano-convex lens is arranged at the position corresponding with the middle region of the flat display substrate. Alternatively, a plurality of plano-convex lenses are arranged at the position corresponding with the middle region of the flat display substrate. Only one plano-concave lens is arranged at the position corresponding with the middle region of the flat display substrate. Alternatively, a plurality of plano-concave lenses are arranged at the position corresponding with the middle region of the flat display substrate.

In embodiments of the present disclosure, the calculation method for image forming by convex lenses is similar with the method of convex lenses in the above embodiments shown in FIGS. 2-6c, and the calculation method for image forming by concave lenses is similar with the method of concave lenses in the above embodiments shown in FIG. 7, which are not repeated here for simplicity.

Figure 11:
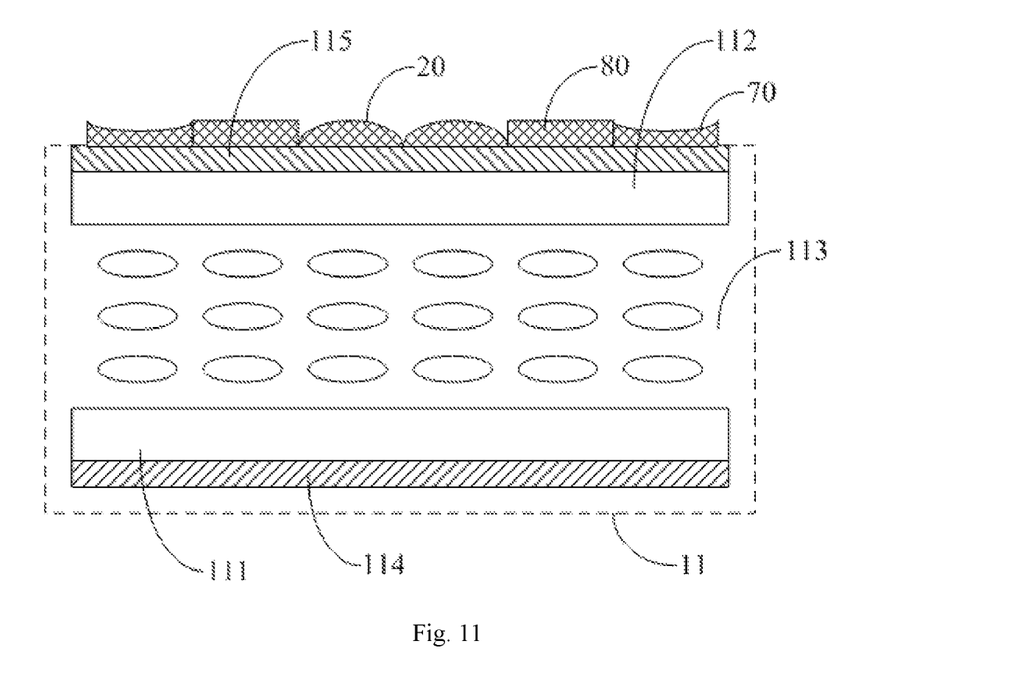
FIG. 11 is a structural view for illustrating a display panel in an embodiment of the present disclosure in which a portion of the optical devices are convex lenses, another portion of the optical devices are concave lenses, and the remaining optical devices are liquid crystal lenses.

For example, as shown in FIG. 11, a portion of the optical devices are the convex lenses 20, another portion of the optical devices are concave lenses 70, and the remaining optical devices are liquid crystal lenses 80. In an embodiment, the focus length of the convex lenses 20, the focus length of the concave lenses 70, and the voltage across the first and second electrode in the liquid crystal lenses 80 are set appropriately, so that the image formed by the flat display substrate lies in a spatially curved surface. These parameters can be set according to practical production, in view of the image forming principle in embodiments shown in FIGS. 2-9, which is not repeated here for simplicity.

Moreover, in embodiments of the present disclosure, the combination of convex lenses and liquid crystal lenses, and the combination of concave lenses and liquid crystal lenses are similar with the combination of convex lenses and concave lenses, which are not repeated here for simplicity.

Embodiments of the present disclosure further provide a display device comprising the display panel as described in the above embodiments. The display device is a display device like a mobile phone, tablet computer, notebook computer, liquid crystal panel, liquid crystal display device, liquid crystal TV, organic light emitting diode (OLED) panel, OLED display device, OLED TV, or electronic paper.

To sum up, embodiments of the present disclosure provide a display panel, comprising a flat display substrate and optical devices, wherein the optical devices are arranged on a display surface of the flat display substrate, and light emitted through the display surface of the flat display substrate passes through the optical devices and forms an image in a curved surface. The display panel is provided with optical devices on the display surface of the flat display substrate, and the optical devices enable an image formed by the flat display substrate to lie in a spatially curved surface. Therefore, in embodiments of the present disclosure, the curved display effect is realized without physically and mechanically curving the flat display substrate, and this enhances the visual impact effect for the user.

Apparently, the person with ordinary skill in the art can make various modifications and variations to the present disclosure without departing from the spirit and the scope of the present disclosure. In this way, provided that these modifications and variations of the present disclosure belong to the scopes of the claims of the present disclosure and the equivalent technologies thereof, the present disclosure also intends to encompass these modifications and variations.

What is claimed is:

1. A display panel, comprising a flat display substrate and optical devices, wherein the optical devices are arranged on a display surface of the flat display substrate, and light emitted through the display surface of the flat display substrate passes through the optical devices and forms an image in a curved surface,
wherein the optical devices at a position corresponding with a middle region of the flat display panel have a middle region optical parameter which is different from a peripheral region optical parameter of the optical devices at a position corresponding with a peripheral region of the flat display panel,
wherein the position of each of the optical devices corresponds with the position of each pixel or each sub-pixel in the flat display substrate in a one-to-one manner,
wherein the optical devices comprise convex lenses, and
wherein each of the convex lenses is a plano-convex lens, and a convex surface of the plano-convex lens is arranged on a side away from the flat display substrate.

2. The display panel of claim 1, wherein the optical devices comprise convex lenses, and the middle and peripheral region optical parameters are a focus length of the convex lenses.

3. The display panel of claim 1, wherein the optical devices comprise concave lenses, and the middle and peripheral region optical parameters are a focus length of the concave lenses.

4. The display panel of claim 1, wherein the optical devices comprise liquid crystal lenses, and the middle and peripheral region optical parameters are a deflection degree of liquid crystal in the liquid crystal lenses.

5. The display panel of claim 1, wherein the optical devices comprise two of a convex lens, a concave lens, and a liquid crystal lens.

6. The display panel of claim 1, wherein for two convex lenses arranged symmetrically with respect to a central symmetrical axis of the flat display substrate, these two convex lenses have a same optical parameter.

7. The display panel of claim 6, wherein an object distance between each convex lens and the flat display substrate is smaller than a focus length of each convex lens, and the focus length of each convex lens decreases with an increase in a distance between the convex lens and the central symmetrical axis.

8. The display panel of claim 6, wherein an object distance between each convex lens and the flat display substrate is larger than a focus length of each convex lens, and the focus length of each convex lens increases with an increase in a distance between the convex lens and the central symmetrical axis.

9. The display panel of claim 6, wherein an object distance between each convex lens at a position corresponding with the middle region of the flat display substrate and the flat display substrate is smaller than the focus length of the convex lens at this position, and an object distance between each convex lens at a position corresponding with a peripheral region of the display panel and the flat display substrate is larger than the focus length of the convex lens at this position.

10. The display panel of claim 1, wherein each of the convex lenses is a combination of a half plano-convex lens with a complete plano-convex lens, a half plano-convex lens, or a complete plano-convex lens.

11. The display panel of claim 1, wherein the optical devices comprise liquid crystal lenses; for two liquid crystal lenses arranged symmetrically with respect to the central symmetrical axis of the flat display substrate, these two liquid crystal lenses have a same deflection degree of liquid crystal.

12. The display panel of claim 11, wherein the position of each of the liquid crystal lenses corresponds with the position of each pixel or each sub-pixel in the flat display substrate in a one-to-one manner.

13. A display device, comprising the display panel of claim 1.

14. A display panel, comprising a flat display substrate and optical devices, wherein the optical devices are arranged on a display surface of the flat display substrate, and light emitted through the display surface of the flat display substrate passes through the optical devices and forms an image in a curved surface,
wherein the optical devices at a position corresponding with a middle region of the flat display panel have a middle region optical parameter which is different from a peripheral region optical parameter of the optical devices at a position corresponding with a peripheral region of the flat display panel,
wherein the optical devices comprise concave lenses, and
wherein a focus length of each of the concave lenses decreases with an increase in a distance between the concave lens and the central symmetrical axis.

15. A display panel, comprising a flat display substrate and optical devices, wherein the optical devices are arranged on a display surface of the flat display substrate, and light emitted through the display surface of the flat display substrate passes through the optical devices and forms an image in a curved surface,
wherein the optical devices at a position corresponding with a middle region of the flat display panel have a middle region optical parameter which is different from a peripheral region optical parameter of the optical devices at a position corresponding with a peripheral region of the flat display panel,
wherein the position of each of the optical devices corresponds with the position of each pixel or each sub-pixel in the flat display substrate in a one-to-one manner,
wherein the optical devices comprise concave lenses, and
wherein each of the concave lenses is a plano-concave lens, and a concave surface of the plano-concave lens is arranged on a side away from the flat display substrate.

16. The display panel of claim 15, wherein the concave lens is a combination of a half plano-concave lens with a complete plano-concave lens, a half plano-concave lens, or a complete plano-concave lens.

* * * * *